Patented May 26, 1942

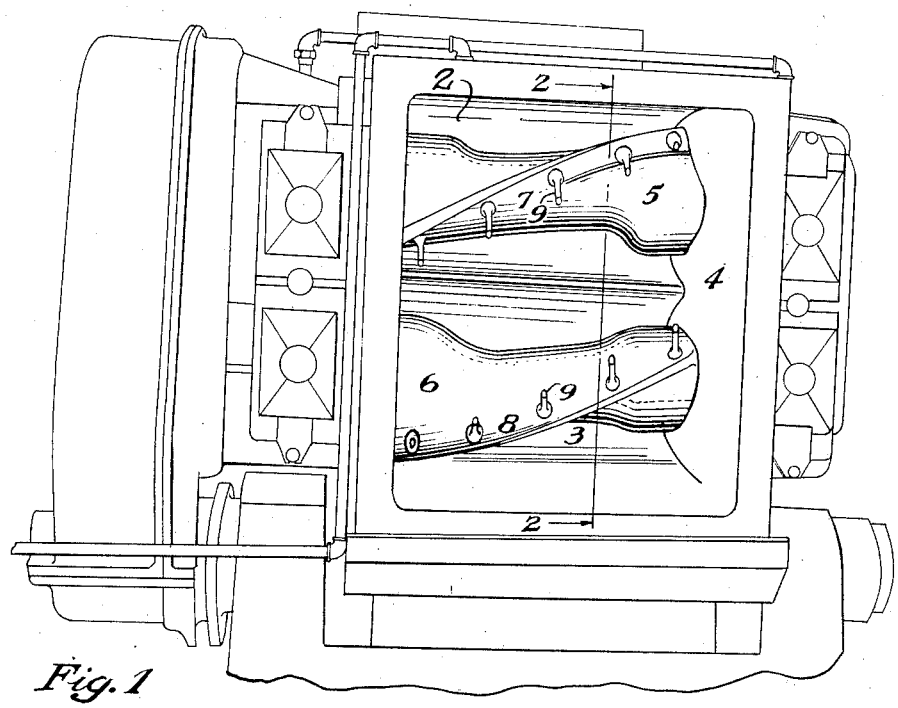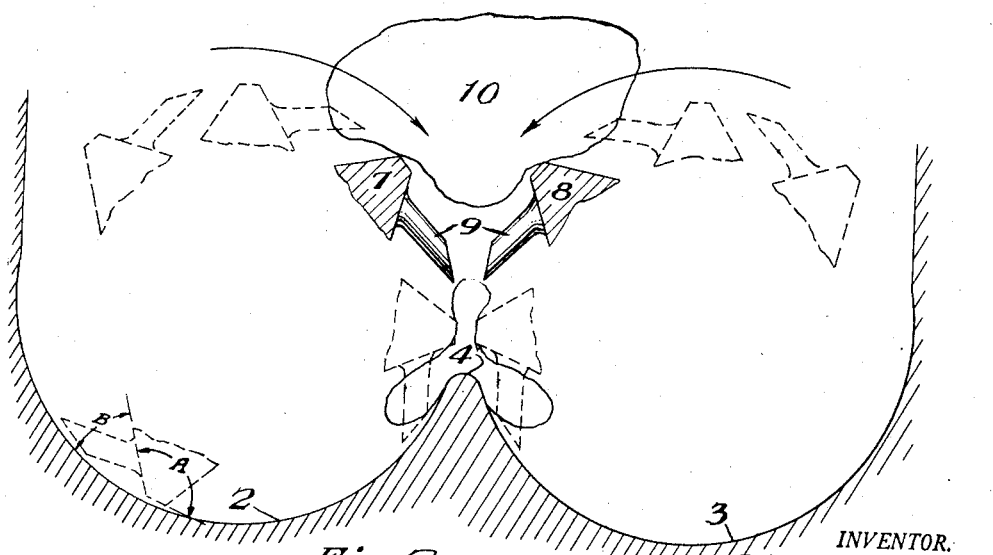

2,284,549

UNITED STATES PATENT OFFICE 2,284,549

APPARATUS FOR PLASTICIZING, WASHING, OR DISSOLVING RUBBER OR THE LIKE

Leon Yablonski, Saginaw, Mich., assignor to Baker Perkins Inc., Saginaw, Mich., a corporation of New York Application December 26, 1939, Serial No. 310,983

4 Claims. (Cl. 18—2)

This invention relates to machines for masticating, washing, dissolving, or plasticizing tough elastic materials such as rubber or rubberlike synthetics, hereinafter referred to as "rubber," and has for its object the improvement of the rotor and blade structure customarily employed in oppositely driven pairs in a receptacle having adjacent parallel arcuate bottom sections which intersect to form a ridge or saddle between the rotors. A rotor is journaled coaxially in each trough section, and each pair is driven so that the rotors turn inwardly and downwardly toward the saddle between them. They are driven in known manner at the same or different speeds so that they coact with the saddle and with each other to engage large pieces of rubber and stretch and break them over the saddle. Each rotor has one or more blades presenting edges formed and located to crush and rub the material against the arcuate trough surface, plasticizing it and continually exposing fresh surfaces to the action of the washing fluid or solvent.

Machines of this kind employed for the purpose described have had serious limitations arising from the nature of the material treated. Because of the tough, elastic nature of rubber, and because of its slipperiness when wet it has been extremely difficult for the blades heretofore used to properly grip the material to stretch and break it over the saddle and then to urge it into the small working clearances between their edges and the arcuate trough surfaces. The pieces of live rubber when compressed between the convergent blade and trough surfaces tended to spring ahead of the blade out of the effective working zone. Large pieces of material also escaped from between the blades as they were urged downwardly upon the saddle for the necessary initial reduction to smaller pieces which would enter between the blades and the trough surface.

This last difficulty required that the rubber be fed in small uniform chunks, but since there was always the likelihood that the rotors might engage an occasional larger piece and greatly increase the load and strain above normal, the earlier machines had to be made exceptionally strong and provided with a large reserve of power to handle pieces larger than usual. The machines therefore were heavy and costly to build and operate, considering the relatively small amount of material which could be worked efficiently, and their output per unit of time was low.

In these previous machines cumbersome and expensive means were employed to urge rubber and like material into the working zones of the rotors. For example, a massive weighted cover, or piston, was fitted into the neck of the receptacle and rested upon the charge of rubber so that it was at all times forced into contact with the blades. In effect this filled the rotor space solidly full, so that the entire mass of material was stirred, greatly increasing the power required above that needed for doing the actual tearing and plasticizing work, and heating the rubber excessively so that effective cooling means had to be provided. A less cumbersome but expensive way of accomplishing the same purpose, and subject to the same objections, was to provide a movable cover or corresponding plunger-like portion of the wall of the receptacle and hydraulic or other power means for urging it inwardly to maintain pressure on the charge of rubber.

The present invention eliminates the need for such pressure devices, materially reduces the power required and consequently minimizes the heating of the rubber. It permits the feeding of pieces of all sizes into the machine, enhances the effectiveness of the tearing and breaking action of the blades and saddle, and finally, improves the co-operative plasticizing action of the blades and arcuate trough surfaces by minimizing the tendency of the rubber to escape from between them.

It provides, in combination with the rotor customarily used heretofore in machines of this kind, novel sharpened elements located and arranged to engage pieces of rubber before they are engaged by the blades proper and grip them positively so that they are stressed and broken over the saddle by the blade edges. These elements also have a piercing and tearing action upon the rubber so that fresh surfaces are continuously exposed to the washing fluid or solvent, and they hold the material in the effective working zone immediately ahead of the blade edge so that discrete pieces are less apt to be squeezed outwardly ahead of the blade from between the convergent surfaces of the blade and trough. These piercing, gripping, and tearing elements cooperate with the saddle, the blade edges, and the trough sections in a novel relationship representing more than the sum of the properties of the individual elements, which are old in the art. The bladed rotors are well known, and spiked tearing, combing, or beating rotors have been commonly employed in mills of various kinds for breaking up or shredding solid materials. The instant invention includes a novel combination of these elements, which will now be described.

In the accompanying drawing, forming a part of this specification,

Fig. 1 shows a rubber treating machine embodying the invention, tilted into its discharging position so that the trough and rotors appear in plan view;

Fig. 2 is a fragmentary vertical section, taken along line 2—2 in Fig. 1, showing diagrammatically the action of rotors according to the invention upon pieces of rubber.

The drawing shows a machine to which the invention is applied, comprising a trough or receptacle 1 having its bottom formed to present two parallel arcuate sections 2, 3 which intersect to present a ridge or saddle 4 of known kind. Rotors 5 and 6 are journaled coaxially in trough sections 2 and 3, respectively, and are driven in the direction of the arrows in Fig. 2 by suitable gearing and power means, not shown. Rotors 5, 6 are formed to present blades 7, 8, presenting working edges that travel closely adjacent the arcuate inner surfaces of the trough sections 2, 3, respectively. The leading face of each blade forms an obtuse angle A with its working edge and an acute angle B with the arcuate trough wall, so that as the rotor turns material tends to be trapped between them and squeezed into the small clearance between the blade edge and the trough surface. Here it is forcibly rubbed over the trough surface and, in known manner, worked into a plastic condition.

A plurality of elongated teeth 9 are fixed on the leading faces of the blades, projecting from the blade forwardly in the direction of rotation and outwardly toward the pitch circle of the blade edges. The outer ends of teeth 9 are preferably given a beveled point, as shown, so that they will readily penetrate pieces of rubber which they encounter.

In Fig. 2 successive positions of blades 7 and 8 and the projecting teeth 9 are shown diagrammatically in broken lines. It can be seen here that spike-like teeth 9 project from the leading faces of the blades 7, 8 so that they will engage nearly endwise a large piece 10 of rubber entering between the blades. The conventional blades heretofore used, without teeth 9, but with their leading faces and edges shaped for plasticizing material against the arcuate surfaces of the trough, would meet a large material piece 10 at an obtuse angle, and tended somewhat to deflect it across rather than to pull it down upon the saddle, as is necessary to break it into pieces small enough to be worked between the blades and the trough surfaces. With exceptionally large pieces of tough and elastic material it was obviously necessary to urge them downwardly with considerable force in order to overcome this tendency to be squeezed out from between the approaching leading faces of the blades 7, 8. The addition of prong-like elements 9 insures, first, that large pieces of rubber, such as 10, will be pierced and engaged tenaciously enough so that they will be drawn at once down over the saddle 4 to be pulled apart by the oppositely moving edges of blades 7 and 8. However, if a large piece is too tough to be broken at the first instance the spikes 9 will tear through and out of it, weakening the piece and exposing fresh raw surfaces to the washing fluid or solvent. The washing or dissolving process is thus forwarded and on the next engagement of the blades and teeth the weakened piece will be more readily broken over the saddle.

As each large chunk 10 is torn and broken into halves over the saddle the small pieces thus formed are retained by the teeth between the convergent leading face of a blade 7 or 8 and the adjacent wall of trough 2 or 3. In the absence of teeth 9, relatively large discrete pieces have a pronounced tendency to spring outward from between the blades and the trough, repeatedly escaping the desired plasticizing action, thus increasing the time required to reduce a batch completely to the desired condition. The spikes or teeth 9, piercing the freshly torn pieces and positioned ahead of the blade edges, tend to prevent the escape of such pieces and insure that they will promptly be subjected to plasticizing. Thereby the speed with which small discrete particles and pieces are rubbed to the uniform plastic state necessary for complete washing or dissolving is greatly enhanced.

It is to be understood that the form of my invention herewith shown and described is a preferred example of the same, and various changes in the number, shape, size, and arrangement of the blades and the co-operative projecting teeth 9 may be resorted to without departing from the spirit of the invention or the scope of the following claims.

Having thus described my invention, what I claim and desire to secure by Letters Patent is:

1. In a machine for washing, dissolving, or plasticizing tough, elastic material, in combination, a receptacle comprising two parallel trough sections arcuate in cross-section and intersecting to present a ridge-like saddle between them, a rotor journaled in each trough section coaxially therewith and driven to rotate inwardly and downwardly toward said saddle, each of said rotors presenting a blade having a working edge formed and positioned to co-operate with the saddle and the rotor on the opposite side of the saddle to stretch and break pieces of material and to coact with the arcuate surface of its trough section to plasticize the material, and a plurality of spaced prongs fixed to said rotor at points inset from the working edge of said blade and projecting forwardly and outwardly in advance of said working edge toward its circle of revolution.

2. A rotor for a machine for washing, dissolving, or plasticizing tough elastic material, said machine having a receptacle comprising two parallel trough sections arcuate in cross-section and intersecting to present a ridge-like saddle, said rotor adapted to be journaled in a trough section coaxially therewith and driven to rotate inwardly and downwardly toward said saddle, said rotor presenting a blade having a working edge formed and positioned to co-operate with the saddle and arcuate surface of its trough section to break down and plasticize pieces of material, and a plurality of spaced prongs fixed to said rotor at points inset from the working edge of said blade and projecting from their points of attachment forwardly and outwardly toward the circle of revolution of said edge, said prongs being adapted to grip, pierce, and tear elastic material and retain it in the effective working zone immediately ahead of said working edge.

3. In a rotor for a machine for washing, dissolving, or plasticizing tough elastic material, having a receptacle comprising two parallel trough sections arcuate in cross-section and intersecting to present a ridge-like saddle, said rotor adapted to be journaled in a trough section coaxially therewith and driven to rotate inwardly and downwardly toward said saddle, said rotor comprising a blade having a working edge formed and positioned to co-operate with the saddle and arcuate trough surface to break down and plasticize pieces of material; in combination, a plurality of spaced prongs fixed to said rotor at points in advance of the working edge of each blade and projecting from their points of attachment forwardly and outwardly toward the circle of revolution of said edge to grip, pierce, and tear elastic material, and retain it in the effective working zone immediately ahead of said working edge.

4. A structure as claimed in claim 3, wherein each prong is beveled substantially tangentially to the circle of revolution of its end to present an elongated material-piercing point.

LEON YABLONSKI.